(12) United States Patent
Kuo

(10) Patent No.: US 6,342,155 B1
(45) Date of Patent: Jan. 29, 2002

(54) APPARATUS FOR MAKING FLUORIDATED AND DRINKING WATER

(75) Inventor: Joseph Kuo, Taichung (TW)

(73) Assignee: Kintech Technology Co., Ltd., Taichung (TW)

( * ) Notice: Subject to any disclaimer, the term of this patent is extended or adjusted under 35 U.S.C. 154(b) by 8 days.

(21) Appl. No.: 09/617,475

(22) Filed: Jul. 17, 2000

(51) Int. Cl.⁷ .............................. C02F 9/00; C02F 1/32; C02F 1/44; C02F 1/78
(52) U.S. Cl. .............. 210/195.1; 210/195.2; 210/257.2; 210/266; 210/416.3
(58) Field of Search .................. 210/195.1, 195.2, 210/266, 257.2, 416.3, 257.1

(56) References Cited

U.S. PATENT DOCUMENTS

| | | | |
|---|---|---|---|
| 4,969,991 A | * | 11/1990 | Valadez |
| 5,108,590 A | * | 4/1992 | Disanto |
| 5,582,717 A | * | 12/1996 | Disanto |
| 5,817,231 A | * | 10/1998 | Souza |
| 5,873,996 A | * | 2/1999 | Rozelle et al. |

* cited by examiner

Primary Examiner—Thomas M. Lithgow
(74) Attorney, Agent, or Firm—Ladas and Parry

(57) ABSTRACT

An apparatus includes a housing, a filter assembly, a water storage tank, a circulating unit connected to the storage tank for receiving water from the storage tank and for returning the water from the circulating unit to the storage tank, a UV sterilizing unit connected to the circulating unit and adapted to sterilize the water flowing through the circulating unit, a fluoridating unit connected to the circulating unit and adapted to add fluorine to the water flowing through the circulating unit, and a water supply part connected to the circulating unit adapted to supply the sterilized and fluoridated drinking water.

6 Claims, 3 Drawing Sheets

APPARATUS FOR MAKING FLUORIDATED AND DRINKING WATER

BACKGROUND OF THE INVENTION

1. Field of the Invention

This invention relates to an apparatus for making fluoridated and sterilized drinking water.

2. Description of the Related Art

FIG. 1 illustrates a conventional apparatus 10 for making drinking water. The apparatus 10 includes a pre-treating filter 11 for removing large particles from the water, a pump 16 connected to an outlet of the pre-treating filter 11 for transporting the water to downstream thereof, an active carbon filter 12 connected to the pump 16 for removing colorants and for deodorizing the water, a fine filtration filter 13 connected to an outlet of the active carbon filter 12 for removing fine particles from the water, a reverse osmosis filter 14 connected to an outlet of the fine filtration filter 13 for removing ultra fine particles, heavy metals, and germs from the water so as to make the water drinkable, and a storage tank 15 connected to an outlet of the reverse osmosis filter 14 for storing the drinking water.

The aforesaid apparatus 10 is disadvantageous in that the apparatus 10 can not provide fluoridated drinking water. Moreover, since the active carbon in the active carbon filter 12 can react with oxygen in the water that passes therethrough, the oxygen level in the water is reduced considerably, thereby adversely affecting the quality of the drinking water. Furthermore, the quality of the water in the storage tank 15 tends to worsen when the apparatus 10 is inactive for a long period of time due to a rapid growth of germs in the storage tank 15.

SUMMARY OF THE INVENTION

Therefore, the object of the present invention is to provide an apparatus for making fluoridated and sterilized drinking water that is capable of overcoming the aforementioned problems.

According to the present invention, an apparatus for making fluoridated and sterilized drinking water comprises: a housing; a filter assembly mounted inside the housing and having a downstream end; a water storage tank mounted inside the housing and including an inlet connected to and in fluid communication with the downstream end of the filter assembly, and an outlet; a circulating unit disposed inside the housing and having a first end connected to and in fluid communication with the outlet of the water storage tank, and a second end connected to and in fluid communication with the water storage tank for returning water to the water storage tank; a UV sterilizing unit connected to the circulating unit between the first and second ends and adapted to sterilize the water flowing through the circulating unit; a fluoridating unit connected to the circulating unit between the first and second ends and adapted to add fluorine to the water flowing through the circulating unit; and a water supply part connected to the circulating unit between the first and second ends and downstream of the UV sterilizing unit and the fluoridating unit and adapted to supply the sterilized and fluoridated drinking water.

BRIEF DESCRIPTION OF THE DRAWINGS

In drawings which illustrate an embodiment of the invention.

DETAILED DESCRIPTION OF THE PREFERRED EMBODIMENT

Figure 1:
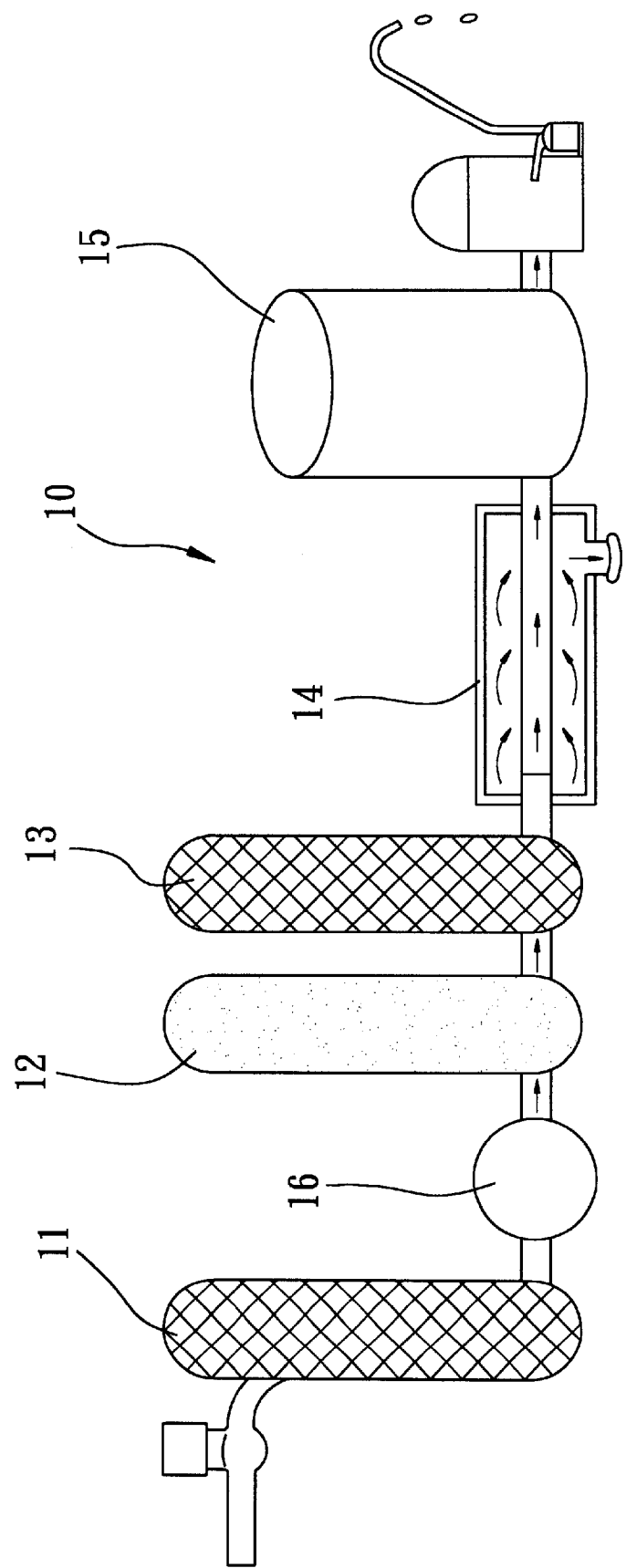
FIG. 1 is a schematic view of processing units of a conventional apparatus for making drinking water.
Figure 2:
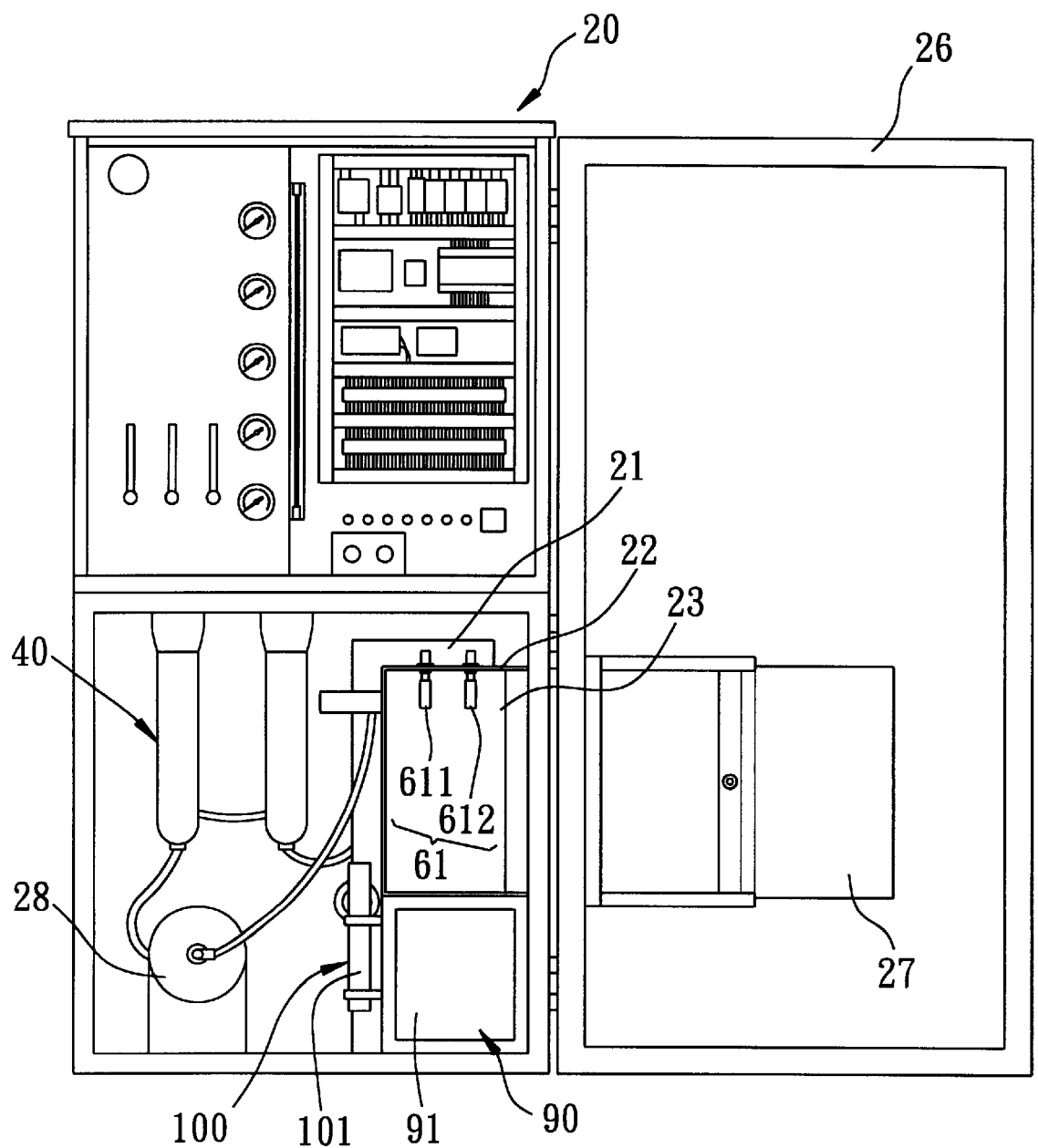
FIG. 2 is a schematic front view of an apparatus embodying this invention for making fluoridated and sterilized drinking water.
Figure 3:
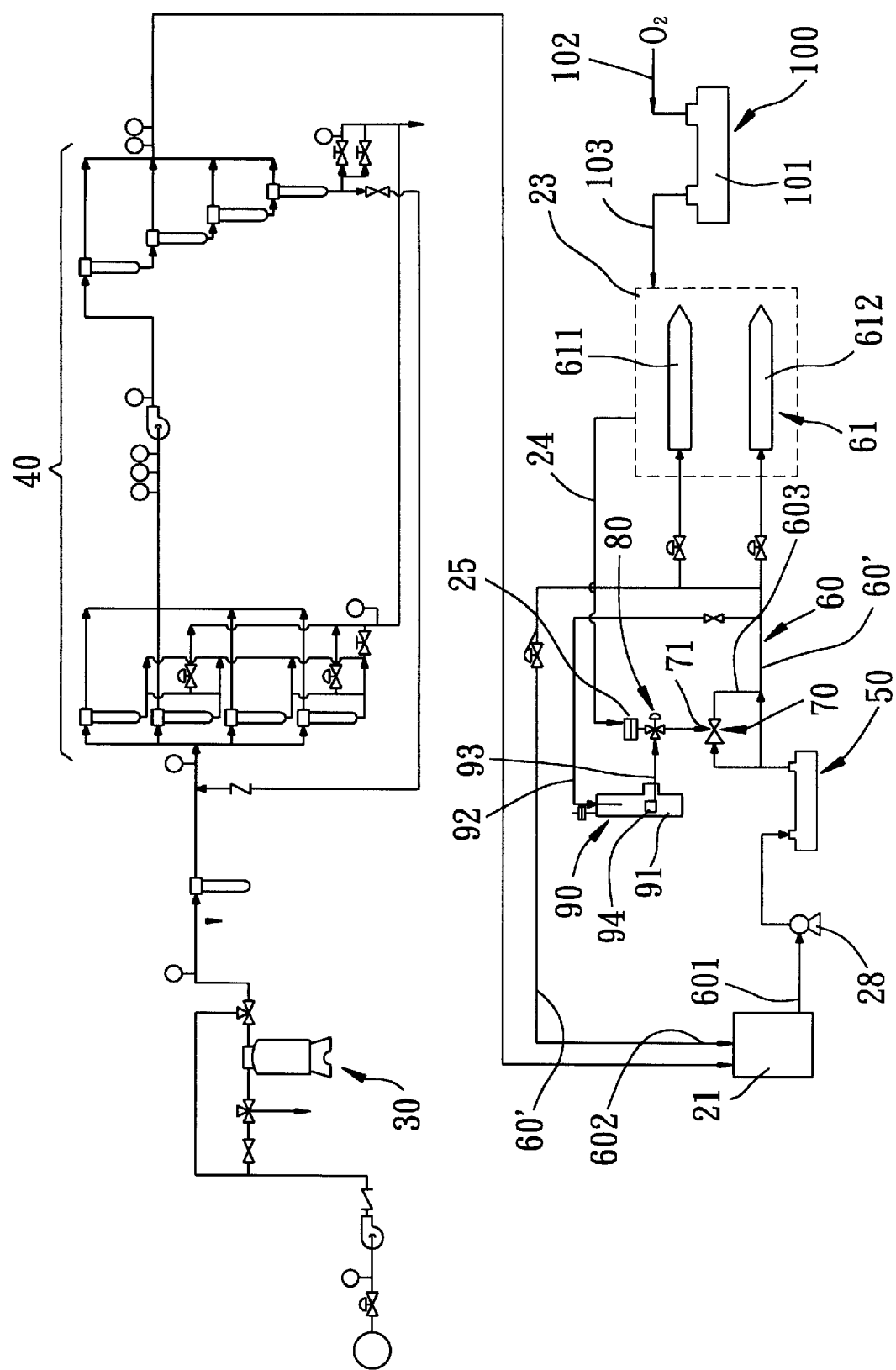
FIG. 3 is a schematic view of processing units of the apparatus of FIG. 2.

FIGS. 2 and 3 illustrate an apparatus 20 embodying this invention for making fluoridated and sterilized drinking water. The apparatus 20 includes a housing 20 which receives therein a filter assembly, a water storage tank 21, a UV sterilizing unit 50, a fluoridating unit 90, an ozone generator 100, a water supply part 61, a venturi-nozzle-type suction device 70, and a circulating unit 60.

The housing 20 includes a main door 26, and a compartment 23 disposed therein and confining an ozone receiving space. The compartment 23 is provided with a middle door 27 mounted on the main door 26 for closing and accessing the ozone receiving space.

The filter assembly includes an active carbon filter 30 adapted to be connected to a water supply, such as a tap water pipeline, and a reverse osmosis filter 40 connected to an outlet of the active carbon filter 30 and having a downstream end.

The storage tank 21 includes an outlet and an inlet connected to and in fluid communication with the downstream end of the reverse osmosis filter 40.

The circulating unit 60 includes a main pipe line 60' having a first end 601 connected to and in fluid communication with the outlet of the water storage tank 21, and a second end 602 connected to and in fluid communication with the water storage tank 21, thereby permitting the return of water to the water storage tank 21. A pump 28 is connected to the main pipe line 60' adjacent to the first end 601 of the main pipe line 60' for transporting water to the water supply part 61.

The UV sterilizing unit 50 is connected to the main pipe line 60' between the first and second ends 601, 602 of the main pipe line 60', and is adapted to sterilize the water flowing therethrough. The main pipe line 60' is provided with a by-pass 603 immediately downstream of the UV sterilizing unit 50.

The fluoridating unit 90 is disposed between the first and second ends 601, 602 of the main pipe line 60', and includes a container 91 adapted to contain a fluoride solution and a calcium fluoride power deposited in the fluoride solution. The container 91 has an inlet end 92 connected to and in fluid communication with the main pipe line 60' for entry of the water from the circulating unit 60 to the container 91 to serve as a solvent for dissolving the calcium fluoride power in the fluoride solution (solubility of the calcium fluoride in water is about 15 ppm under room temperature), an outlet end 93, and a surface level-responsive control unit 94 adapted to permit entry of the water from the circulating nit 60 into the container 91 when the surface level of the fluoride solution in the container 91 is lower than a predetermined level.

The venturi-nozzle-type suction device 70 has two opposite ends connected to and in fluid communication with the by-pass 603, and includes a nozzle 71 disposed between the two opposite ends and connected to the outlet 93 of the container 91 via a three-way control valve 80 so as to draw the fluoridated solution from the container 91 into the circulating unit 60 via the suction device 70 and the by-pass 603 when the water flows through the suction device 70 in a direction from one end of the two opposite ends to the other end of the two opposite ends. The suction device 70 is preferably designed to allow the concentration of the fluorine in the sterilized and fluoridated water, which comes out of the water supply part 61, to be controlled at a level below 1 ppm so as to ensure that the water that comes out is safe drink.

The water supply part 61 includes first and second tap members 611, 612 mounted on and extending into the compartment 23, and connected to the main pipe line 60' between the first and second ends 601, 602 of the main pipe line 60' and downstream of the UV sterilizing unit 50 and the fluoridating unit 90 for supplying the sterilized and fluoridated drinking water.

The ozone generator 100 includes a UV lamp 101 (capable of emitting UV light with a wavelength of 185 µm), an air inlet 102, and an ozone outlet 103 connected to and in fluid communication with the compartment 23 for providing ozone into the ozone receiving space in the compartment 23 for space sterilizing purpose. The compartment 23 is connected to and is in fluid communication with the three-way control valve 80 via an ozone pipe line 24 for drawing ozone from the ozone receiving space in the compartment 23 into the circulating unit 60 via the three-way control valve 80, the suction device 70 and the by-pass 603, thereby permitting the ozone to be input into the water storage tank 21 via the circulating unit 60 and thus being able to sterilize not only the water contained in the circulating unit 60 but also the water stored in the water storage tank 21. An air filter 25 is connected to the ozone pipe line 24 anterior of the three-way control valve 80 for removing fine particles carried by ozone flowing from the ozone receiving space in the compartment 23. The sterilized drinking water from the water supply part 61 can also be used for sterilizing articles, such as nursing bottles, because of the presence of the ozone in the sterilized water.

The three-way control valve 80 is capable of switching between a first position, in which the ozone pipe line 24 is in fluid communication with the suction device 70, and a second position, in which the container 91 is in fluid communication with the suction device 70.

With the arrangement of the ozone generator 100, the suction device 70, and the circulating unit 60 in the apparatus of this invention, the quality of the supplied drinking water can be improved, thereby eliminating the problems associated with the prior art.

With the invention thus explained, it is apparent that various modifications and variations can be made without departing from the spirit of the present invention. It is therefore intended that the invention be limited only as recited in the appended claims.

I claim:

1. An apparatus for making fluoridated and sterilized drinking water, comprising:

a housing;

a filter assembly mounted inside said housing and having a downstream end;

a water storage tank mounted inside said housing and including an inlet connected to and in fluid communication with said downstream end of said filter assembly, and an outlet;

a circulating unit disposed inside said housing and having a first end connected to and in fluid communication with said outlet of said water storage tank, and a second end connected to and in fluid communication with said water storage tank for returning water to said water storage tank;

a UV sterilizing unit connected to said circulating unit between said first and second ends and adapted to sterilize the water flowing through said circulating unit;

a fluoridating unit connected to said circulating unit between said first and second ends and adapted to add fluorine to the water flowing through said circulating unit; and a water supply part connected to said circulating unit between said first and second ends and downstream of said UV sterilizing unit and said fluoridating unit and adapted to supply the sterilized and fluoridated drinking water.

2. The apparatus as claimed in claim 1, further comprising an ozone generator mounted inside said housing, an air filter connected to and in fluid communication with said ozone generator, and a venturi-nozzle-type suction device connected to and in fluid communication with said circulating unit and said air filter to draw ozone from said ozone generator to said circulating unit.

3. The apparatus as claimed in claim 2, further comprising a compartment disposed in said housing and confining an ozone receiving space that is connected to and that is in fluid communication with said ozone generator and said air filter, said water supply part extending into said ozone receiving space.

4. The apparatus as claimed in claim 3, wherein said compartment has a door opening for access to said ozone receiving space.

5. The apparatus as claimed in claim 2, wherein said fluoridating unit includes a container adapted to contain a fluoride solution, said container having an inlet end connected to and in fluid communication with said circulating unit for entry of the water from said circulating unit to said container to serve as a solvent, an outlet end connected to and in fluid communication with said suction device to add the fluoride solution to the water flowing in said circulating unit via said suction device, and a surface level-responsive control unit adapted to permit entry of the water from said circulating unit into said container when the surface level of the fluoride solution in said container is lower than a predetermined level.

6. The apparatus as claimed in claim 5, further comprising a three-way control valve connected to said air filter, said outlet end of said container, and said suction device, said control valve being capable of switching between a first position, in which said air filter is in fluid communication with said suction device, and a second position, in which said container is in fluid communication with said suction device.

* * * * *